United States Patent
Lindvall

(10) Patent No.: US 8,265,719 B2
(45) Date of Patent: Sep. 11, 2012

(54) LINK MECHANISM

(75) Inventor: Magnus Lindvall, Lund (SE)

(73) Assignee: Sony Mobile Communications AB, Lund (SE)

( * ) Notice: Subject to any disclaimer, the term of this patent is extended or adjusted under 35 U.S.C. 154(b) by 1147 days.

(21) Appl. No.: 12/109,640

(22) Filed: Apr. 25, 2008

(65) Prior Publication Data

US 2009/0227301 A1 Sep. 10, 2009

Related U.S. Application Data

(60) Provisional application No. 61/033,541, filed on Mar. 4, 2008.

(51) Int. Cl.
*H04M 1/00* (2006.01)

(52) U.S. Cl. ............... 455/575.4; 455/550.1; 455/515.1; 455/575.3; 361/679.06; 16/341

(58) Field of Classification Search ............ 16/303, 16/367; 128/206.19
See application file for complete search history.

(56) References Cited

U.S. PATENT DOCUMENTS

| 7,508,411 | B2 * | 3/2009 | Boesen | 348/14.02 |
|---|---|---|---|---|
| 7,567,830 | B2 * | 7/2009 | Hur | 455/575.4 |
| 2002/0077161 | A1 * | 6/2002 | Eromaki | 455/575 |
| 2005/0044665 | A1 | 3/2005 | Kuramochi | |
| 2005/0272487 | A1 * | 12/2005 | Lee | 455/575.4 |
| 2006/0252471 | A1 | 11/2006 | Pan | |
| 2007/0186380 | A1 | 8/2007 | Kim et al. | |
| 2007/0243896 | A1 * | 10/2007 | Maatta et al. | 455/550.1 |
| 2007/0252202 | A1 | 11/2007 | Park et al. | |
| 2008/0161075 | A1 * | 7/2008 | Kim et al. | 455/575.4 |
| 2008/0274776 | A1 * | 11/2008 | Cho et al. | 455/575.4 |
| 2011/0003624 | A1 * | 1/2011 | Jung et al. | 455/575.4 |

FOREIGN PATENT DOCUMENTS

EP 1 843 559 A1 10/2007

OTHER PUBLICATIONS

International Preliminary Report on Patentability, corresponding to PCT/EP2008/062248, completion date Apr. 16, 2010.
International Search Report, corresponding to PCT/EP2008/062248, date of mailing Dec. 7, 2009.
Written Opinion, corresponding to PCT/EP2008/062248, date of mailing Dec. 7, 2009.

* cited by examiner

*Primary Examiner* — Matthew Anderson
*Assistant Examiner* — Fatuma Sherif
(74) *Attorney, Agent, or Firm* — Renner, Otto, Boisselle & Sklar, LLP

(57) ABSTRACT

The present invention concerns a portable electronic apparatus, such as a mobile phone, having an upper part being moveable in relation to a lower part of the apparatus. The movement of the upper part may both be a sliding and a tilting movement. The sliding movement is controlled by means of a sleeve and a guide placed in the upper part of the apparatus. The sleeve is connected to the lower part by means of pair of links at opposite sides of the apparatus. The links are received at opposite ends of each sleeve at fulcrums at the sleeve and lower part, respectively. The links are designed and positioned to give self-locking in at least three distinct positions of the upper part of the portable electronic apparatus in relation to the lower part of the apparatus.

15 Claims, 4 Drawing Sheets

LINK MECHANISM

This application claims the benefit of U.S. Provisional Patent Application Ser. No. 61/033,541, filed Mar. 4, 2008, the entire disclosure of which is hereby incorporated by reference.

TECHNICAL FIELD

The present invention concerns a mechanism for movements of two parts of a portable electronic apparatus, such as a mobile phone, in relation to each other.

BACKGROUND

In mobile phones having mutually moving parts it is known to have a closed position where only a limited number of functions or no functions are available and an open position in which normally all functions of the mobile phone are available.

SUMMARY

The present invention concerns how to control the movement from the closed position to the open position, in which open position one of the parts of the mobile phone is inclined in relation to the other part. The inclined part normally includes one or more displays.

The invention is based on the use of a link mechanism and other parts in order to achieve well-defined sliding and rotational movements of an upper part of a portable electronic apparatus in relation to a lower part of the portable electronic apparatus. The movement must normally enable a contact for signal transfer between the two parts, for example in the form of a thin film. The movement has built in physical stops forming at least three distinct positions. The mechanism of the portable electronic apparatus is preferably pre-loaded to keep the distinct positions.

The portable electronic apparatus may advantageously, but not necessarily, be embodied as a mobile terminal, such as a mobile phone for a mobile telecommunications system. In the embodiments of the enclosed drawings the portable electronic apparatus has the form of a mobile phone. For ease of description the term "mobile phone" will generally be used throughout this description in a not limiting way. Thus, "mobile phone" should be construed broadly.

The invention comprises a pair of links on each side of the mobile phone or other portable electronic apparatus, connecting the upper and lower parts at four rotational joints or fulcrums. The exact positions of the fulcrums are geometrically determined in order to establish a predefined movement. The mechanism of the present invention can be made relatively compact (lateral dimension), has built in self-locking ability in multiple positions, offers good structural strength in relation to its size, and has a low degree of complexity. In one embodiment the pairs of links on opposite sides of the mobile phone are connected to each other in such a way that the movement is translated to the other side even if force to open is applied on one side only. Thus, one obviates that the upper part will be distorted by being skewed during the tilting movement. Also for the sliding movement there may be means to hinder skewing of the moving part.

The predefined movement may be divided into two parts. The first part is a sliding movement and the second part is a tilting movement. All movements could be defined as movements for the upper part of the mobile phone in relation to the lower part. The mobile phone of the present invention has three distinct positions, with self-locking.

By means of the present invention all of the upper side of the lower part will normally be available in the open position. In the state of the art it is common that only about ⅔ of the upper side is available.

As used in this description "upper", "lower" and similar expressions are in relation to the mobile phone having the orientation as shown in the enclosed drawings. A person skilled in the art realises that the mobile phone may have any orientation during use.

According to an aspect of the present invention, a portable electronic apparatus having an upper part and a lower part, which upper part is arranged moveable in relation to the lower part, wherein the movement of the upper part includes both a sliding movement and a tilting movement, wherein the sliding movement of the upper part is controlled by sleeves moving along guides, which sleeves are arranged connected to the lower part and which guides and sleeves are arranged in the upper part and wherein the sleeves of the upper part is connected by means of links to the lower part.

According to another aspect, the links include pair of links arranged at opposite sides of the portable electronic apparatus, wherein the links are rotated during the tilting movement, wherein one end of each link is received in a fulcrum each at the sleeve of the upper part of the portable electronic apparatus and wherein the other ends of each link is received at a fulcrum each at the lower part of the portable electronic apparatus.

According to another aspect, the upper part may assume three distinct positions in relation to the lower part, wherein a first distinct position is with the upper part parallel with the lower part and placed covering the lower part in a closed position of the portable electronic apparatus, a second distinct position is with the upper part slid to an end position in which the upper part is displaced in relation to the lower part but being parallel with the lower part and a third distinct position is with the upper part moved to an inclined position in relation to the lower part.

According to another aspect, the links and fulcrums are designed and placed in such a way that one end of one link will abut the other link in each distinct position.

According to another aspect, an upper end of a forward link abuts a rear link during the sliding movement of the upper part and in the first and second distinct positions, wherein an upper end of the rear link abuts the forward link in the third distinct position, e.g., with the upper part of the portable electronic apparatus inclined in relation to the lower part of the portable electronic apparatus and wherein there is no mutual movement between the links during the sliding movements of the upper part in relation to the lower part.

According to another aspect, a part or parts projecting from one of two adjacent links abut the other link in each distinct position.

According to another aspect, bistable arrangements pre-load the upper part towards respective distinct position.

According to another aspect, the pre-load acting on the tilt movement of the upper part is larger than the maximum load acting on the sliding movement when the upper part is moved from the first distinct position to the third distinct position and wherein the pre-load of the bistable arrangement acting on the sliding movement is larger than the maximum force of the bistable arrangement acting on the tilting movement when the upper part is moved from the third distinct position to the first distinct position.

According to another aspect, an element is placed in the lower part, which element is connected to a forward link at each side of the lower part or a rear link at each side of the lower part in such a way that the element rotates together with the forward or rear links.

According to another aspect, a mechanism to establish the pre-load is placed on the element.

According to another aspect, the mechanism to establish a pre-load is a cam acting on a cam surface of a biased member.

According to another aspect, the mechanism to establish a pre-load are inner and outer cam parts biased towards each other and having a curved interface.

According to another aspect, one cam part rotates with the element while the other cam part does not rotate and wherein one cam part show bosses received in grooves of a sleeve, whereby the cam part having bosses may slide longitudinal in the sleeve with the bosses in the grooves.

According to another aspect, the element mentioned above is a bar.

According to another aspect, a connection plate or other means is connected to sleeves on opposite sides of the upper part.

According to another aspect, the portable electronic apparatus is a mobile phone.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The invention will be described further below by way of an example and with reference to the enclosed drawings.

BRIEF DESCRIPTION OF THE DRAWINGS

In the enclosed drawings.

DESCRIPTION

Figure 1:
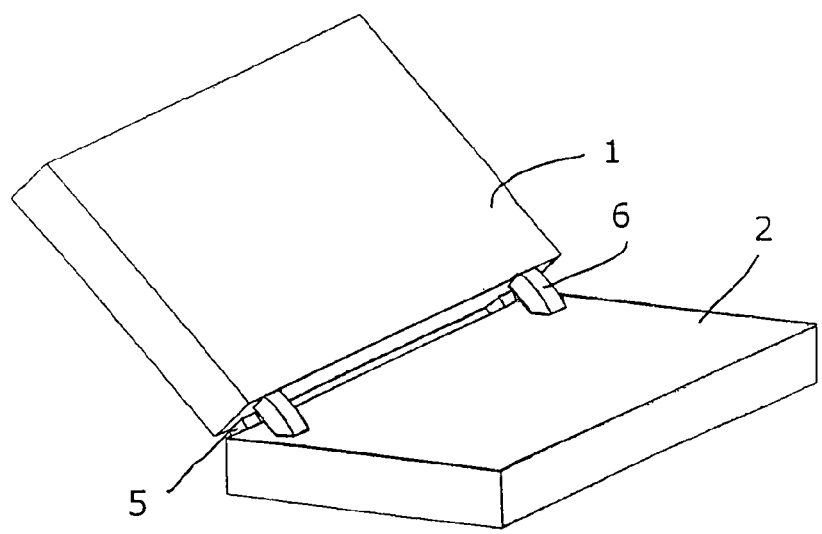
FIG. 1 shows a perspective schematic view from above of a mobile phone in an open position.
Figure 2:
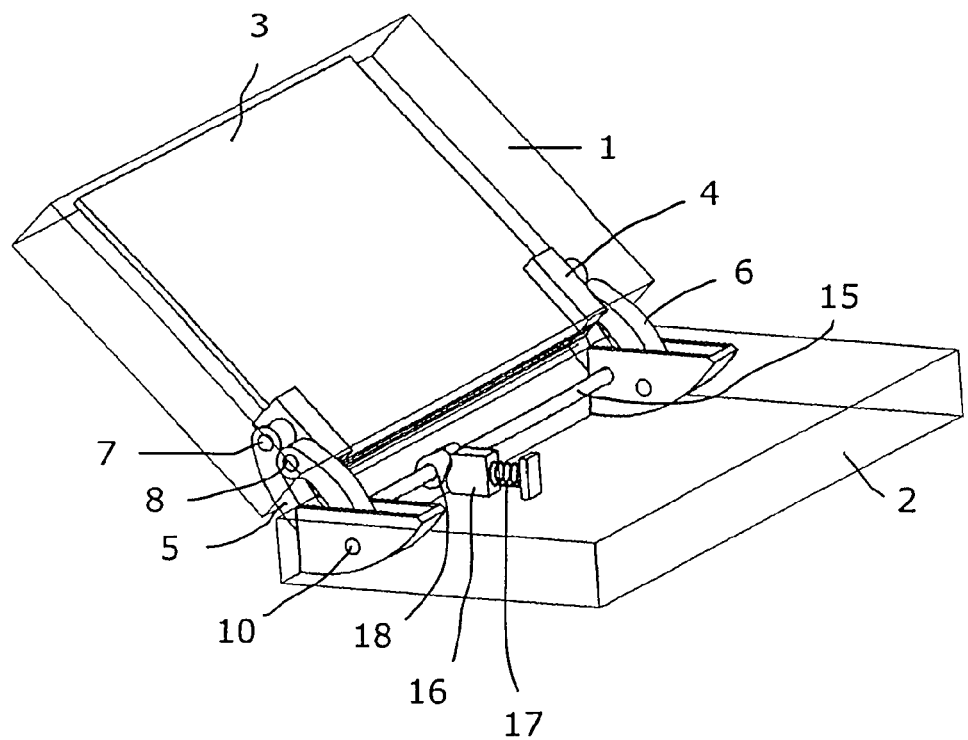
FIG. 2 shows a view corresponding with FIG. 1, with transparent parts to illustrate the mechanism to control movements.

The mobile phone has an upper part 1 and a lower part 2 connected to each other by means of a link mechanism.

The upper part 1 has one or more guides 3 along which one or mores sleeve 4 may be slid. The one or more sleeves 4 are connected to the lower part by means of the link mechanism, but both the sleeve 4 and the guide 3 are arranged in the upper part 1. The lower and upper parts 1, 2 can slide in relation to each other by means of the guide 3 and sleeve 4. A person skilled in the art realises that the exact design of the sleeve and guide may vary within the scope of the present invention.

The link mechanism comprises pairs of links 5, 6 at opposite sides of he mobile phone. The links 5, 6 are each connected at one end to the sleeve 4 of the upper part 1 in a fulcrum 7, 8 or joint. The other ends of the links 5, 6 are each connected to a fulcrum or joint 9, 10 on the lower part 2. The links 5, 6 are placed at one end 13 of the lower part 2. The links 5, 6 are received rotatable in the fulcrums 7-10. By means of the links 5, 6 a kind of hinge mechanism is formed between the upper part 1 and the lower part 2. As used in this description the link 5 closest to the end of the lower part 2 is referred to as the forward link and the other link 6 is referred to as the rear link.

In use the mobile phone has three distinct positions. A first or closed position in which the upper part 1 is placed directly over the lower part 2. In this distinct position, showed in FIG. 4, the upper part 1 normally covers the lower part 2. A second distinct position is the position in which a sliding movement of the upper part 1 is ended. In that distinct position the upper part 1 is displaced in relation to the lower part 2, but both parts 1, 2 are parallel. In a third distinct position the upper part 1 has been tilted upwards in relation to the lower part 2. Thus, in this third distinct position the upper part 1 is inclined in relation to a plane containing the lower part 2.

The upper part 1 has a first end 11 placed above a first end 12 of the lower part 2 in the closed position of the mobile phone. During the sliding movement the first end 11 of the upper part 1 will move towards a second end 13 of the lower part 1. During the tilting movement the first end 11 of the upper part 1 will move further towards the second end 13 of the lower part 2 at the same time as the first end 11 of the upper part 1 is first lifted upwards away from the lower part 2 and will then sink back towards the lower part 2. Thus, the first end 11 of the upper part 1 will follow a part of a curve during the tilting movement.

The mutual movement between the upper and lower parts 1, 2 is influenced by bistable arrangements in the form of spring arrangements, cam curves or the like, well known to a person skilled in the art. The function of the bistable arrangements is that it will urge the moving parts to assume the end positions of the movement. Thus, for the sliding movement the first movement of the upper part 1 in relation to the lower part 2 will be against the force of the bistable arrangement, but after reaching about half way of the sliding movement the bistable arrangement will urge the upper part 1 to assume the other end position. Thus, during the first part of the sliding movement the upper part 1 will be moved against the force of the bistable arrangement and during the second part of the sliding movement the upper part 1 will be moved with the assistance of the force of the bistable arrangement. It could be said that the sleeve 4 is pre-loaded to assume the end positions of the sliding movement. Also the links 5, 6 are pre-loaded by bistable arrangements to assume the end positions of the tilting movement.

The links 5, 6 and the fulcrums 7-10 are arranged in such a way that during the sliding movement an upper part of the forward link 5 abuts the rear link 6.

If the user in closed position of the mobile phone tries to lift the first end of the upper part 1 from the lower part 2, the abutment of the upper part 1 of the forward link 5 against the rear link 6 will hinder such a lifting movement. It is also possible to arrange special stops or mechanisms for instance to hinder that the upper part is tilted upwards directly from the totally closed position of the mobile phone. This may be realized by a pin or the like at either the upper or lower part 1, 2 going into an opening of the other part in said closed position of the mobile phone.

In the shown embodiment a bar 15 is placed between the lower fulcrums 9 of the forward links 5. The bar 15 is arranged to rotate when the forward links 5 rotate. By this arrangement the upper part 1 will not be skewed during the tilting movement, even if the user would press on only one side of the upper part 1. The same effect would be accomplished if the bar is arranged between the lower fulcrums 10 of the rear links 6. Even if the part connecting the lower fulcrums 9 of the forward links 5 is shown as a bar 15 a person skilled in the art realises that this element may have any design as long as it rotationally connects the lower fulcrums 9 of the forward links 5.

Figure 3:
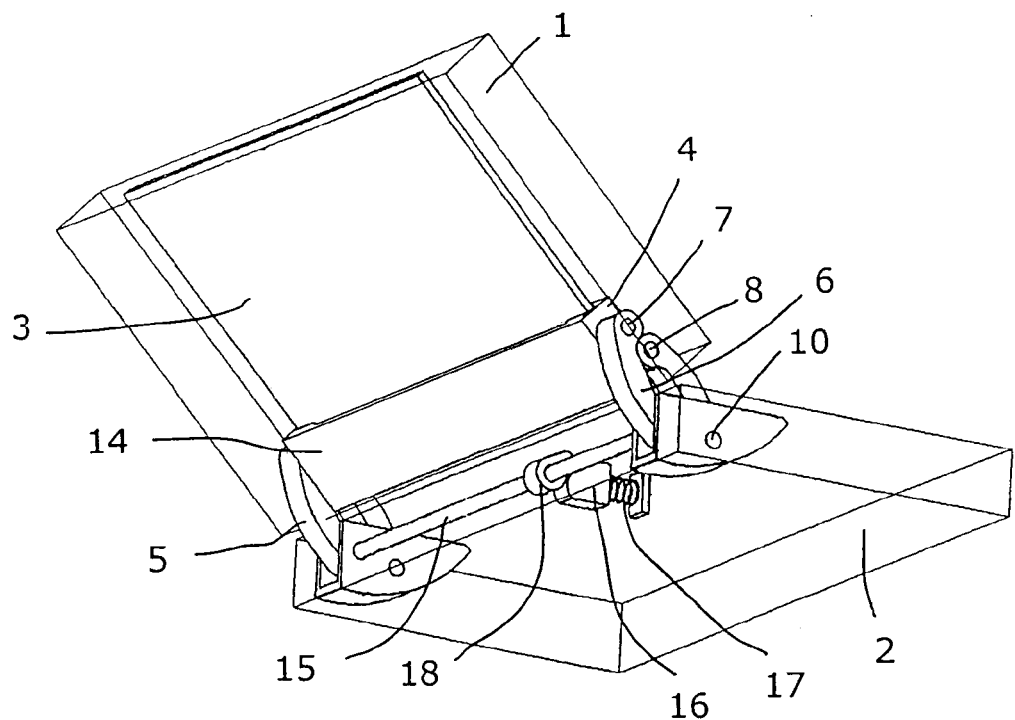
FIG. 3 shows a perspective view from below of the mobile phone of FIG. 2, thus, also with transparent parts.

The connection between the sleeve 4 and the guide 3 has stops at the end positions of the sliding movement. In the embodiment indicated in FIG. 3 one sleeve 4 is arranged on opposite sides of the upper part 1. The sleeves 4 are connected by a plate 14 in the shown embodiment, stabilizing the sleeves 4. A person skilled in the art realises that the part connecting the sleeves 4 may have any form as long as it stabilise the sleeves 4. In the shown embodiment the guide 3 has the form of a plate. In practice the guide 3 will move inside the sleeves 4 in this embodiment. A person skilled in the art realises that the parts used to control the sliding movement may be designed and arranged in many different ways.

The tilt movement will be mechanically stopped when the upper end of the rear link 6 abuts the forward link 5. As stated above the bistable arrangement will urge the upper part 1 to assume and keep the open end position as shown in FIGS. 1-3 and 6.

In the open position the upper part 1 incline at an angle in relation to the lower part 2. In the shown embodiment the angle is about 45°. A person skilled in the art realises that other inclinations may be used. In another embodiment the angle is about 30°. By amending the positions of the fulcrums 7-1 0, the lengths of the links 5, 6 and/or the design of the links 5, 6 it is possible to control the movement of the upper part 1 in relation to the lower part 2. Thus, it is possible to have other inclinations for the upper part 1 in the open position and to have another movement for the upper part 1 in relation to the lower part 2.

Figure 7:
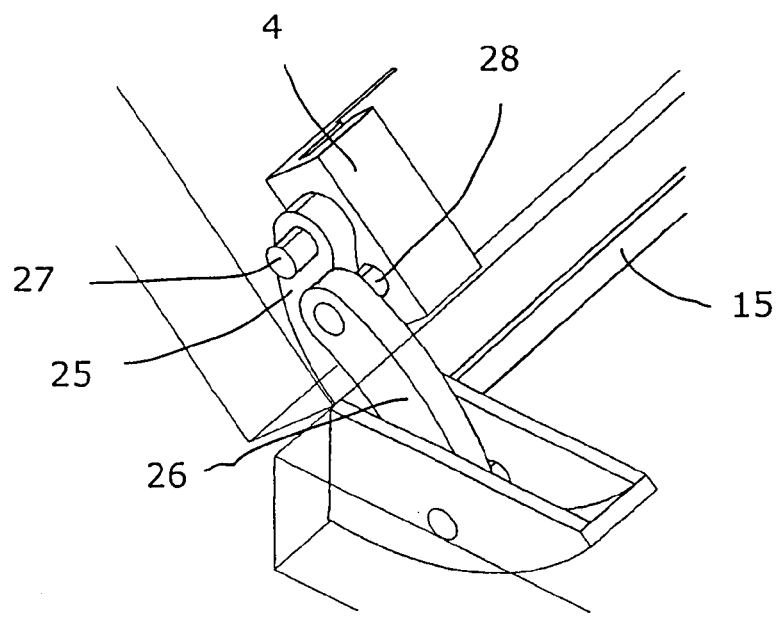
FIG. 7 shows a detailed view of a part of a mobile phone according to the present invention.

In the shown embodiments of FIGS. 1-6 the links 5, 6 are symmetrical and placed in the same vertical plane. In other embodiments the links may be given different forms and may be placed in different planes. If the links are placed in different lateral planes one of the links will normally have some part that goes into the lateral plane of the other link, in order to define the end positions of the tilt movements. In the embodiment of FIG. 7 the forward link 25 is placed in another vertical plane than the rear link 26. In the open end position of the mobile phone the forward link 25 abuts a shaft 28 of the upper part of the rear link 26. When the upper part 1 of the mobile phone is tilted down the rear link 26 will abut a shaft 27 of the upper part of the forward link 25. The shafts 27, 28 normally also form fulcrums for the links 25, 26. A person skilled in the art realises that other parts than shafts projecting from the links may be used. The design of the links may to some extent be used in view of the esthetical appearance of the mobile phone in the different end positions. It is for instance possible to control the distance between the upper and lower parts 1, 2 in the open end position, by designing the links in a suitable way.

Figure 8:
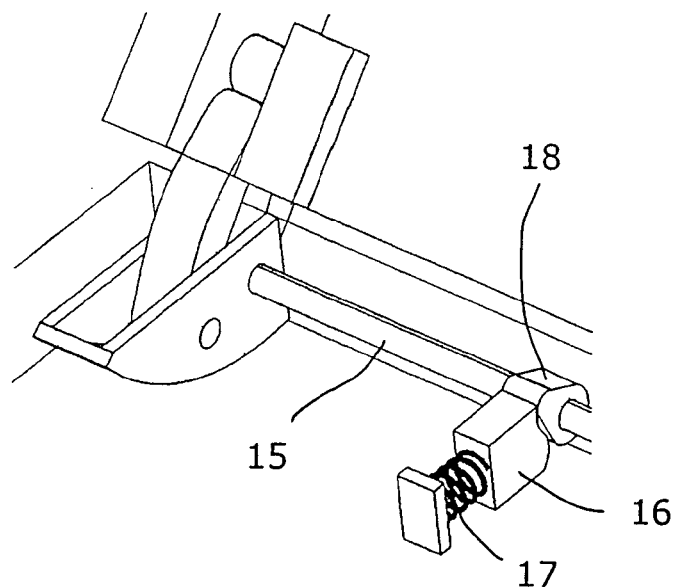
FIG. 8 shows a detailed view of a part of a mobile phone according to the present invention.
Figure 9:
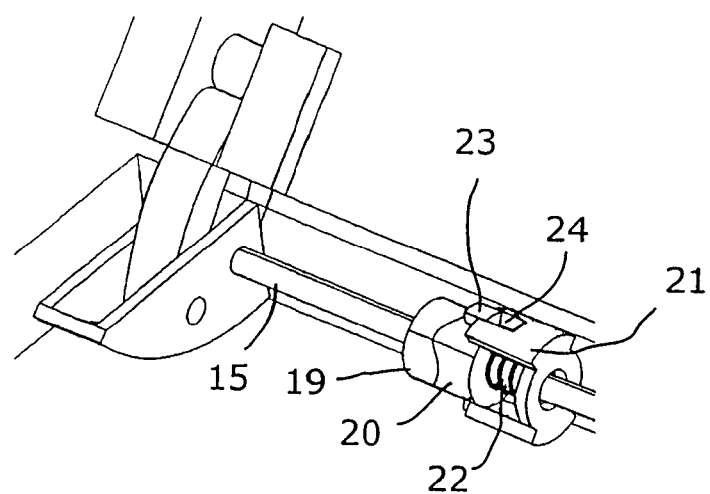
FIG. 9 shows a detailed view of an alternative embodiment of the part of FIG. 8.

On the bar 15, or other element connecting the forward links 5, a mechanism is arranged to apply a force on the tilting movement, which force is different depending on the direction of rotation. The function of this mechanism on the bar 15 is to assist in controlling the tilting and sliding movements in order for the upper and lower parts 1, 2 to move in the desired fashion during opening and closing. The desired fashion is that respective sliding and tilting movement should be ended before the other movement starts. In order for the movement to appear in the correct, desired order in opening of the mobile phone the pre-load of the bistable arrangement acting on the tilting movement should be larger than the maximum force of the bistable arrangement acting on the sliding movement. Thereby the sliding movement will come to an end before the tilting movement commences. When closing the mobile phone the arrangement should be the other way around, i.e. the force of the bistable arrangement acting on the tilting movement should be less than the force of the bistable arrangement acting on the sliding movement. Two different embodiments for this mechanism are shown in FIGS. 8 and 9. A person skilled in the art realises that the desired function with different forces depending on direction of movement may be realised in many different ways. It is also obvious that the function could be realised either for the tilting movement or for the sliding movement.

Figure 4:
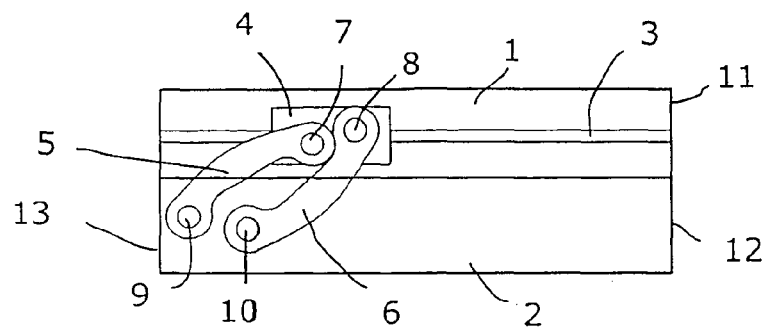
FIGS. 4-6 show sketches of a mobile phone, having two parts placed in different positions in relation to each other.
Figure 5:
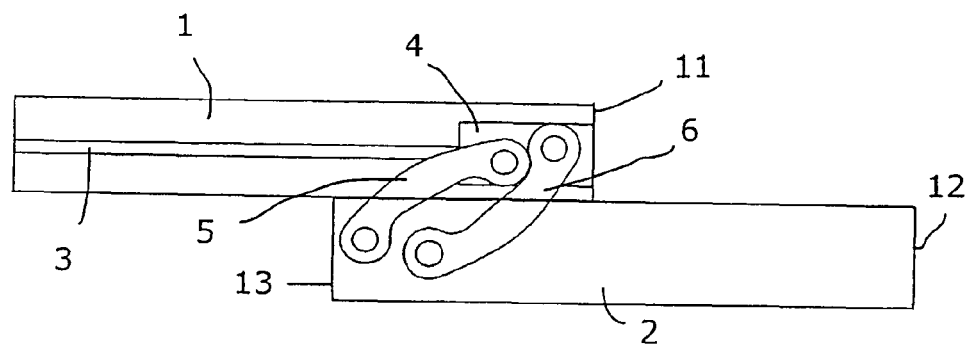
Figure 6:
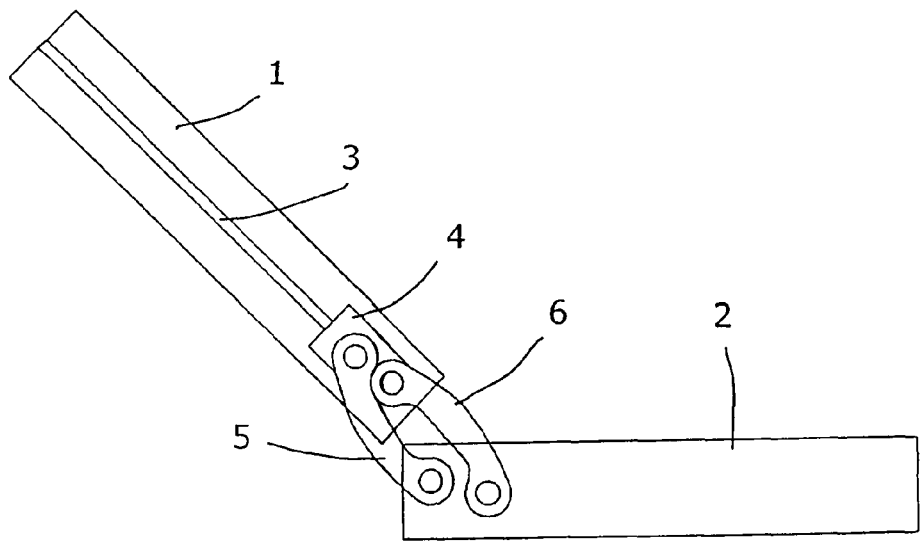

In use the mobile phone is normally in the first closed position (FIG. 4). When the user wants to open the mobile phone he will press at the first end 11 of the upper part 1. The upper part 1 will then slide in relation to the lower part 2 until it reaches the end position for the sliding movement (FIG. 5). If the user continues to press on the first end 11 of the upper part 1 the upper part 1 will tilt up to the open end position (FIG. 6). Instead of continuing to press on the first end of the upper part 1 the user may lift the other end of the upper part 1 upwards to the open end position (FIG. 6).

To close the mobile phone the above movements are repeated in the inverse order. Thus, in this case the user will first tilt the upper part 1 downwards to a position where the upper and lower parts 1, 2 are displaced but parallel in relation to each other. Then the upper part 1 is slid to the closed position of the mobile phone. In this direction the force acting against the tilting movement of the upper part 1 should be less than the force acting on the sliding movement of the upper part. This feature is important in order to hinder that the sliding movement of the upper part 1 starts before the tilting movement is completed. The feature of different forces acting against movements in different direction may for instance be accomplished by using unsymmetrical cam curves. Another alternative is to have mechanical stops hindering movements that are not in the desired sequence.

In the embodiment of FIG. 8 a member 16 biased by a spring 17 is co-operating with a cam 18 placed on the bar 15. The cam 18 is fixed to the bar 15 in a way to be rotated together with the bar 15. In other embodiments the cam is an integrated part of the bar. The cam 18 abuts a cam surface on the biased member 16. In the position showed in FIG. 8 the upper part 1 of the mobile phone has been tilted to the fully open position. When the upper part 1 is tilted down the bar 15 will rotate, thus rotating the cam 18. The rotating movement of the bar 15 will be counteracted in that the biased member 16 is pressed against the cam 18 by means of the spring 17. By the form of the cam surface in contact with the cam 18, the upper part 1 will return to the fully open position if the closing force is removed before the tilting movement is about halfway to the lower position, in which the upper part 1 is parallel with the lower part 2. When the tilting movement is past a position about halfway to the lower position the form of the cam surface of the biased member 16 will urge the upper part 1 to said lower position. Thus, the tilting movement will have two distinct end positions, one fully open position in which the upper part 1 inclines in relation to the lower part 2, and one lower position in which the upper part 1 is parallel with the lower part 2 but displaced in relation to the lower part 2. By controlling the steepness of the cam curve the force to be overcome to tilt the upper part 1 in relation to the lower part 2 may be controlled.

The mechanism of FIG. 9 is another embodiment fulfilling the same function as the embodiment of FIG. 8. In this case an outer cam part 19 and an inner cam part 20 are urged against each other by means of a spring 22. The inner cam part 20 is received in a sleeve 21. The inner cam part 20 has one or more bosses 23, each boss being received in a groove 24 of the sleeve 21. Each boss 23 is free to move in longitudinal direction in respective groove 24. The sleeve 21 and the outer cam part 19 are fixed on the bar 15 in longitudinal direction of the bar 15, while the inner cam part 20 may slide along the bar 15. The outer cam part 19 will be rotated when the bar is rotated, while the inner cam part 20 and the sleeve 21 will not rotate with the bar 15. A person skilled in the art realises that the movability may be the other way around, i.e. that the sleeve 21 will rotate with the bar 15, bringing the inner part 20 along with the rotation, while the outer cam part 19 will not rotate with the bar 15. The inner and outer cam parts 19, 20 abut each other along a curved interface. By adjusting the form of the interface between the inner and outer cam parts 19, 20 it is possible to control the force to be overcome for rotating the bar 15 in respective direction. The steepness of the curved interface controls the magnitude of the force to be overcome in respective direction.

Thus, it could be said that in the shown embodiment the mechanism on the bar 15 should give an asymmetric counter force depending on the direction of rotation of the bar 15.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

I claim:

1. A portable electronic apparatus having an upper part and a lower part, which upper part is arranged moveable in relation to the lower part, wherein the movement of the upper part comprises both a sliding movement and a rotational tilting movement, wherein the sliding movement of the upper part is controlled by sleeves moving along guides, which sleeves are arranged connected to the lower part and which guides and sleeves are arranged in the upper part and wherein the sleeves of the upper part are connected by means of links to the lower part, wherein the links comprise pairs of links, each pair arranged at opposite sides of the portable electronic apparatus, wherein the links are rotated during the tilting movement, wherein one end of each link is received in a fulcrum each at the sleeve of the upper part of the portable electronic apparatus and wherein the other end of each link is received at a fulcrum each at the lower part of the portable electronic apparatus.

2. The portable electronic apparatus of claim 1, wherein the upper part may assume three distinct positions in relation to the lower part, wherein a first distinct position is with the upper part parallel with the lower part and placed covering the lower part in a closed position of the portable electronic apparatus, a second distinct position is with the upper part slid to an end position in which the upper part is displaced in relation to the lower part but being parallel with the lower part and a third distinct position is with the upper part moved to an inclined position in relation to the lower part.

3. The portable electronic apparatus of claim 2, wherein the links and fulcrums are designed and placed in such a way that one end of one link will abut the other link in each distinct position.

4. The portable electronic apparatus of claim 2, wherein an upper end of a forward link abuts a rear link during the sliding movement of the upper part and in the first and second distinct positions, wherein an upper end of the rear link abuts the forward link in the third distinct position, i.e. with the upper part of the portable electronic apparatus inclined in relation to the lower part of the portable electronic apparatus and wherein there is no mutual movement between the links during the sliding movements of the upper part in relation to the lower part.

5. The portable electronic apparatus of claim 2, wherein a part or parts projecting from one of two adjacent links abut the other link in each distinct position.

6. The portable electronic apparatus of claim 2, wherein bistable arrangements pre-load the upper part towards respective distinct position.

7. The portable electronic apparatus of claim 6, wherein the pre-load acting on the tilt movement of the upper part is larger than the maximum load acting on the sliding movement when the upper part is moved from the first distinct position to the third distinct position and wherein the pre-load of the bistable arrangement acting on the sliding movement is larger than the maximum force of the bistable arrangement acting on the tilting movement when the upper part is moved from the third distinct position to the first distinct position.

8. The portable electronic apparatus of claim 3, wherein an element is placed in the lower part, which element is connected to a forward link at each side of the lower part or a rear link at each side of the lower part in such a way that the element rotates together with the forward or rear links.

9. The portable electronic apparatus of claim 8, wherein a mechanism to establish the pre-load is placed on the element.

10. The portable electronic apparatus of claim 8, wherein the mechanism to establish a pre-load is a cam acting on a cam surface of a biased member.

11. The portable electronic apparatus of claim 8, wherein the mechanism to establish a pre-load are inner and outer cam parts biased towards each other and having a curved interface.

12. The portable electronic apparatus of claim 11, wherein one cam part rotates with the element while the other cam part does not rotate and wherein one cam part show bosses received in grooves of a sleeve, whereby the cam part having bosses may slide longitudinal in the sleeve with the bosses in the grooves.

13. The portable electronic apparatus of claim 8, wherein the element is a bar.

14. The portable electronic apparatus of claim 1, wherein a connection plate or other means is connected to sleeves on opposite sides of the upper part.

15. The portable electronic apparatus of claim 1, wherein the portable electronic apparatus is a mobile phone.

* * * * *